(12) United States Patent
Dodo et al.

(10) Patent No.: US 7,562,765 B2
(45) Date of Patent: Jul. 21, 2009

(54) PANEL CARRYING DEVICE

(75) Inventors: Yasushi Dodo, Tokyo (JP); Hiroaki Kuwano, Tokyo (JP)

(73) Assignee: IHI Corporation, Tokyo (JP)

( * ) Notice: Subject to any disclaimer, the term of this patent is extended or adjusted under 35 U.S.C. 154(b) by 195 days.

(21) Appl. No.: 10/599,286

(22) PCT Filed: May 10, 2004

(86) PCT No.: PCT/JP2004/006564

§ 371 (c)(1),
(2), (4) Date: Sep. 25, 2006

(87) PCT Pub. No.: WO2005/108251

PCT Pub. Date: Nov. 17, 2005

(65) Prior Publication Data

US 2008/0149461 A1    Jun. 26, 2008

(51) Int. Cl.
*B65G 25/00* (2006.01)
(52) U.S. Cl. .............. 198/739; 198/468.01; 198/468.6; 198/750.1
(58) Field of Classification Search ............... 198/739, 198/468.01, 450.1, 750.14; 414/11, 917, 414/680, 729, 749.1, 751.1–753.1, 728, 742, 414/743
See application file for complete search history.

(56) References Cited

U.S. PATENT DOCUMENTS

| | | | |
|---|---|---|---|
| 4,345,864 A | | 8/1982 | Smith, Jr. et al. |
| 5,842,370 A | * | 12/1998 | Hofele et al. ............ 72/405.09 |
| 5,899,108 A | * | 5/1999 | Hofele et al. ............ 72/405.1 |
| 6,223,582 B1 | | 5/2001 | Hofele et al. |
| 6,325,591 B1 | * | 12/2001 | Focke et al. ............ 414/749.1 |
| 6,374,994 B1 | * | 4/2002 | Hofele et al. ............ 198/750.1 |
| 6,374,995 B1 | * | 4/2002 | Hofele et al. ............ 198/750.12 |
| 6,382,400 B1 | | 5/2002 | Hofele et al. |
| 6,428,267 B1 | * | 8/2002 | Terpstra ............ 414/749.6 |
| 6,450,757 B1 | * | 9/2002 | Saeki et al. ............ 414/744.5 |
| 6,557,235 B1 | * | 5/2003 | Katz et al. ............ 29/563 |
| 6,558,107 B1 | * | 5/2003 | Okuno ............ 414/744.5 |
| 6,715,981 B1 | * | 4/2004 | Harsch et al. ............ 414/752.1 |
| 7,001,139 B2 | * | 2/2006 | Mori et al. ............ 414/744.5 |

(Continued)

FOREIGN PATENT DOCUMENTS

DE    196 54 041 A1    6/1998

(Continued)

OTHER PUBLICATIONS

Search Report issued in the corresponding International Patent Application No. PCT/JP2004/006564, completed Jun. 30, 2004 and mailed Jul. 13, 2004.

(Continued)

*Primary Examiner*—Gene Crawford
*Assistant Examiner*—William R Harp
(74) *Attorney, Agent, or Firm*—Griffin & Szipl, P.C.

(57) ABSTRACT

A panel carrying device, including a panel holding device 5 holding a panel 1; a second link mechanism connected to the panel holding device; a first link mechanism pivotally fitted to the second link mechanism; a slide mechanism 20 which moves the first link mechanism in a panel carrying direction; and a swing mechanism 22 which swings the second link mechanism.

11 Claims, 8 Drawing Sheets

U.S. PATENT DOCUMENTS

| | | | |
|---|---|---|---|
| 7,244,091 B2 * | 7/2007 | Mori et al. | 414/744.5 |
| 7,287,950 B2 * | 10/2007 | Schmeink et al. | 414/749.1 |

FOREIGN PATENT DOCUMENTS

| | | |
|---|---|---|
| DE | 101 28 189 A1 | 12/2002 |
| EP | 0 850 709 A1 | 7/1998 |
| EP | 0 850 710 A1 | 7/1998 |
| JP | 07-073756 | 3/1995 |
| JP | 09-201735 | 8/1997 |
| JP | 10-328766 | 12/1998 |
| JP | 2001-038656 | 2/2001 |
| JP | 2001-088072 | 4/2001 |
| JP | 2002-200583 | 7/2002 |

OTHER PUBLICATIONS

Supplemental European Search Report issued in corresponding application No. EP 04 73 2023, completed Aug. 6, 2008 and mailed Aug. 13, 2008.

* cited by examiner

PANEL CARRYING DEVICE

This is a National Phase Application in the United States of International Patent Application No. PCT/JP2004/006564 filed May 10, 2004. The entire disclosure of the above patent application is hereby incorporated by reference.

BACKGROUND OF THE INVENTION

1. Technical Field of the Invention

The present invention relates to a panel carrying device which carries a panel to be molded with a press.

2. Description of the Related Art

For example, since a press molded article such as a panel for an automobile has a complicated shape, a molding step is divided into several stages, and the article is molded by linearly arranged molds. In transfer press and tandem press using such a plurality of presses, a panel carrying device is disposed in order to carry a panel molded with a certain press to the next press in order.

As the panel carrying device for the transfer press, a cross bar type carrying device of [Patent Document 1] has heretofore broadly been used.

This device includes: a lift beam extended over the whole region of each press station and liftably disposed in a line direction; a carrier suspended from the lift beam so as to reciprocate between the stations in the line direction; a cross bar incorporated in the carrier; and a work holding tool attached to the cross bar, and the device simultaneously or intermittently carries workpieces of the stations.

Such a cross bar type carrying device has the following characteristics.

(1) A cam driving system or a motion control by an AC servo motor produces a feed motion of a molded panel between press stations.

(2) The panel is carried by a synthesized motion in a feed direction (horizontal direction) and a lift direction (perpendicular direction), and a vacuum cup attached to a carrying tool referred to as the cross bar adsorbs the panel to carry it.

(3) The cross bars among the press stations are connected to one another in both the feed direction and the lift direction, and the cross bars are interlocked to perform the same motion.

(4) Feed arms to produce the feed motion between the stations are arranged on a front side or a rear side of a series of feed units each usually constituted of a carriage connecting the cross bars to each other and a connecting mechanism, and the feed motion is produced by swinging of the arms.

Moreover, in addition to the above cross bar type carrying device, there are proposed panel carrying devices of Patent Document 2, Patent Document 3, and the like.

[Patent Document 1]
Japanese Patent Application Laid-Open No. 10-328766
[Patent Document 2]
Japanese Patent Application Laid-Open No. 7-73756
[Patent Document 3]
U.S. Pat. No. 6,382,400

In "Transfer Feeder" of "Patent Document 2", a pair of lift beams vertically moved by a lifter is provided with a plurality of carriers self-operated independently with a linear motor, and the work (panel) can be carried at a high speed by use of the linear motor as a driving source.

In "Transfer Press Carrying Device" of [Patent Document 1], the lift beam is provided with a plurality of carriers, and the carriers can carry the works (panels) at the high speed by use of a servo motor as the driving source.

Figure 1:
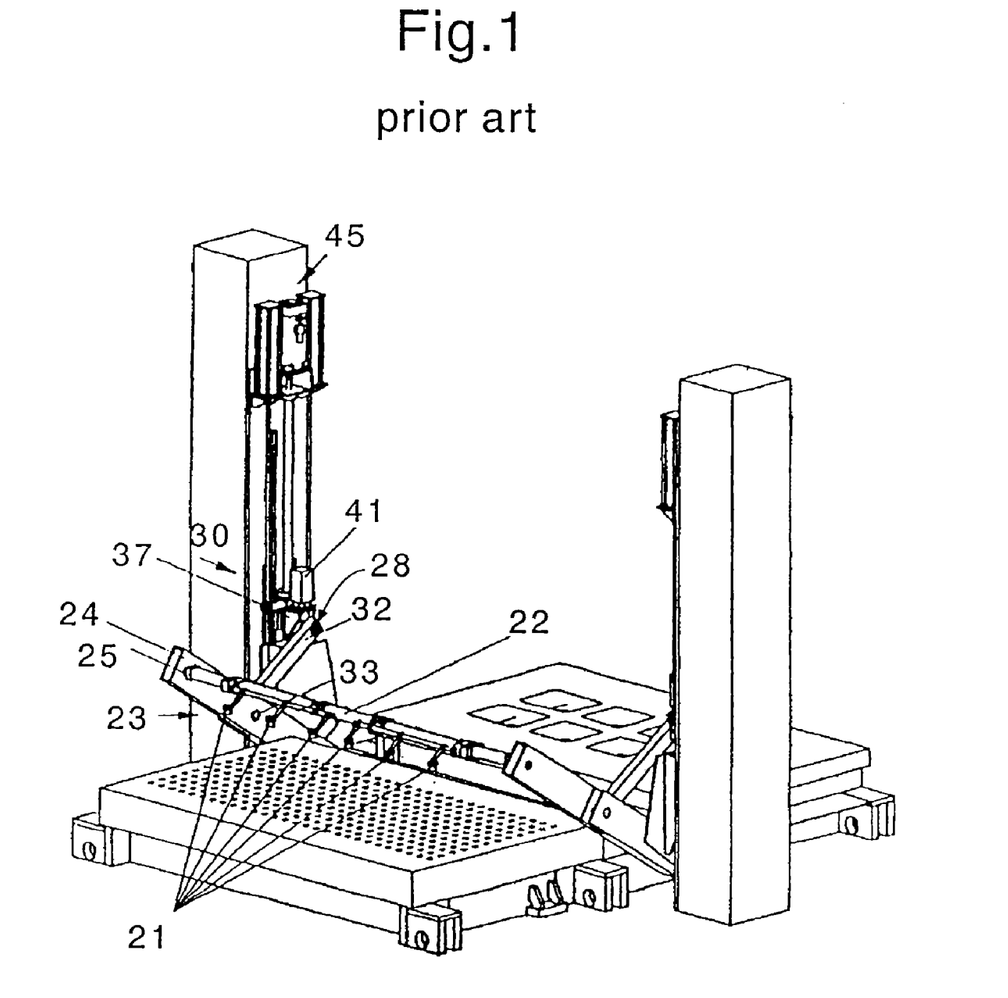
FIG. 1 is a perspective view of a conventional panel carrying device.

In "Transport and Positioning System" of "Patent Document 3" as shown in FIG. 1 includes a driving device 30 provided with a lever mechanism 23 having an output section 25 to drive and position a cross bar 22. This lever mechanism 23 has a swing arm 24 forming the output section 25 on one end, and this output section 25 is connected to the cross bar 22. The swing arm 24 is connected to two points of a support point 28 and a driving point 33 at an interval. The interval between the support point 28 and the driving point 33 is shorter than an interval between the output section and the support point. It is to be noted that in this figure, 21 is each work holding tool attached to the cross bar 22, 32 is a guide rod which connects a slide block 37 to the driving point 33, 41 is a swing motor which swings and drives the guide rod 32, and 45 is a translatory device which vertically moves the slide block 37.

According to this constitution, the translatory device 45 vertically moves the slide block 37, and the swing motor 41 swings the guide rod 32 to thereby drive and position a distant end (driving point 33) of the guide rod 32, and a movement of the rod is enlarged at a lever ratio to drive and position the cross bar 22 to which the work holding tools are attached.

However, the above devices of [Patent Document 1] have the following problems.

(1) Different motions cannot be imparted to the cross bars.

(2) Since the cross bars for all the stations are simultaneously moved, the servo motor and a feed driving unit enlarge.

(3) Since motion curves for the press stations are the same, there occurs a necessity of devising a mold shape in order to avoid interference, and it is difficult to cope with molding of various plates.

Moreover, in a linear motor system of [Patent Document 2], the work can be fed at the high speed by the linear motor, but a separate lift mechanism is required, and the whole structure becomes complicated and enlarged.

In an AC servo system of [Patent Document 1], a high rigidity cannot be obtained owing to a serial link.

In a swing arm system of [Patent Document 3], the swing arm carries the panel. The longer a carrying distance is, the more the arm needs to be lengthened. Deflection or the like of the arm causes vibration.

Furthermore, in a case where the work holding tools are swung (tilted) in order to cope with complicated press molding, a tilting device needs to be separately disposed on the cross bar, and the structure becomes complicated. There are problems that a weight of a movable portion increases, and it becomes further difficult to achieve the high speed.

SUMMARY OF THE INVENTION

The present invention has been developed to solve such problems. That is, a main object of the present invention is to provide a panel carrying device which is capable of: (1) imparting different motions to press stations; (2) easily lightening a movable portion; (3) operating at a high speed with a driving unit having a short stroke, even when a carrying distance is long; and (4) enhancing rigidity of the movable portion to suppress deflection and vibration. Another object of the present invention is to provide a panel carrying device which is capable of swinging (tilting) a work holding tool while the movable portion remains to be light without adding any driving unit such as a motor to the movable portion.

According to the present invention, there is provided a panel carrying device which carries a panel, comprising a panel holding device which holds the panel; a second link mechanism connected to the panel holding device; a first link mechanism pivotally fitted to the second link mechanism; a slide mechanism which moves the first link mechanism in a panel carrying direction; and a swing mechanism which swings the second link mechanism.

According to the above constitution of the present invention, when the first and second links are moved in the panel carrying direction by the slide mechanism, and swung by the swing mechanism, the panel held by the panel holding device can be carried in a predetermined carrying direction. When the movement in the panel carrying direction is combined with the swinging, both speeds are added up. Therefore, even when a carrying distance is long, a high-speed operation can be performed. Furthermore, this panel carrying device can be disposed every press station, and different motions can be imparted to the press stations.

According to a preferable embodiment of the present invention, on opposite sides of the panel holding device, a pair of first link mechanisms, second link mechanisms, slide mechanisms and swing mechanisms are arranged symmetrically with respect to each other.

According to this constitution, the panel can stably be carried.

The second link mechanism includes an output member connected to the panel holding device, an intermediate member constituting an opposite side of the output member and two arms connecting the output member to the intermediate member, which constitute a parallel link.

According to this constitution, when the parallel link is moved, the output member can be lifted and swung (tilted). Since it is not necessary to dispose another driving unit such as a motor on a movable portion, the movable portion can be lightened, and rigidity of the movable portion can be enhanced to suppress deflection and vibration.

The first link mechanism includes two arms connecting the intermediate member to the slide mechanism.

According to this constitution, movement of the slide mechanism in the panel carrying direction can be transmitted to the second link mechanism.

The slide mechanism comprises: a feed slide into which the first link mechanism is pivotally fitted; and a translatory actuator which drives the feed slide in the carrying direction of the panel.

According to this constitution, the feed slide can be moved in the carrying direction of the panel by the translatory actuator, and the movement of the feed slide can be transmitted to the first link mechanism.

The slide mechanism moves the feed slide in the carrying direction of the panel, while two arms of the first link mechanism are kept in parallel with each other.

According to this constitution, a posture of the intermediate member can be kept, and the panel holding device can be moved in the panel carrying direction while held horizontally via the second link mechanism The slide mechanism individually drives two arms of the first link mechanism to move the feed slide in the carrying direction of the panel, and tilts the panel holding device.

According to this constitution, the posture of the intermediate member can be tilted, and the panel holding device can be tilted via the second link mechanism.

The swing mechanism comprises: a swinging link mechanism pivotally fitted to the first link mechanism and the second link mechanism; and a translatory actuator which operates the swinging link mechanism.

According to this constitution, when the translatory actuator operates the swinging link mechanism, the second link mechanism can be swung with respect to the first link mechanism.

The translatory actuator of the swing mechanism drives a swing slide pivotally fitted to the swinging link mechanism in the carrying direction of the panel.

According to this constitution, the translatory actuator can move the swing slide in the carrying direction of the panel, and the movement of the swing slide can be transmitted to the swinging link mechanism.

The translatory actuator of the slide mechanism and a translatory actuator of the swing mechanism are arranged.

According to this constitution, a driving portion to move the slides in the carrying direction of the panel can be disposed to be compact, and it is not necessary to add any driving unit such as a motor to the movable portions of the first and second link mechanisms and the swinging link mechanism.

The translatory actuator of the slide mechanism and a translatory actuator of the swing mechanism are a ball screw and a ball nut, timing belts, hydraulic cylinders, a rack and a pinion, or linear motors.

When these translatory actuators are used, the slides can be linearly operated at the high speed, and correctly positioned.

The panel holding device includes a cross bar connected to the second link mechanism, and a work holding tool attached to the cross bar.

According to this constitution, the second link mechanism moves and swings the cross bar, and the panel holding device attached to the cross bar is allowed to perform a desired operation.

The other objects and advantageous characteristics of the present invention will be apparent from the following description with reference to the accompanying drawings.

DESCRIPTION OF THE PREFERRED EMBODIMENT

Embodiments of the present invention will be described hereinafter with reference to the drawings. It is to be noted that in each drawing, common parts are denoted with the same reference numerals, and redundant description is omitted.

Figure 2:
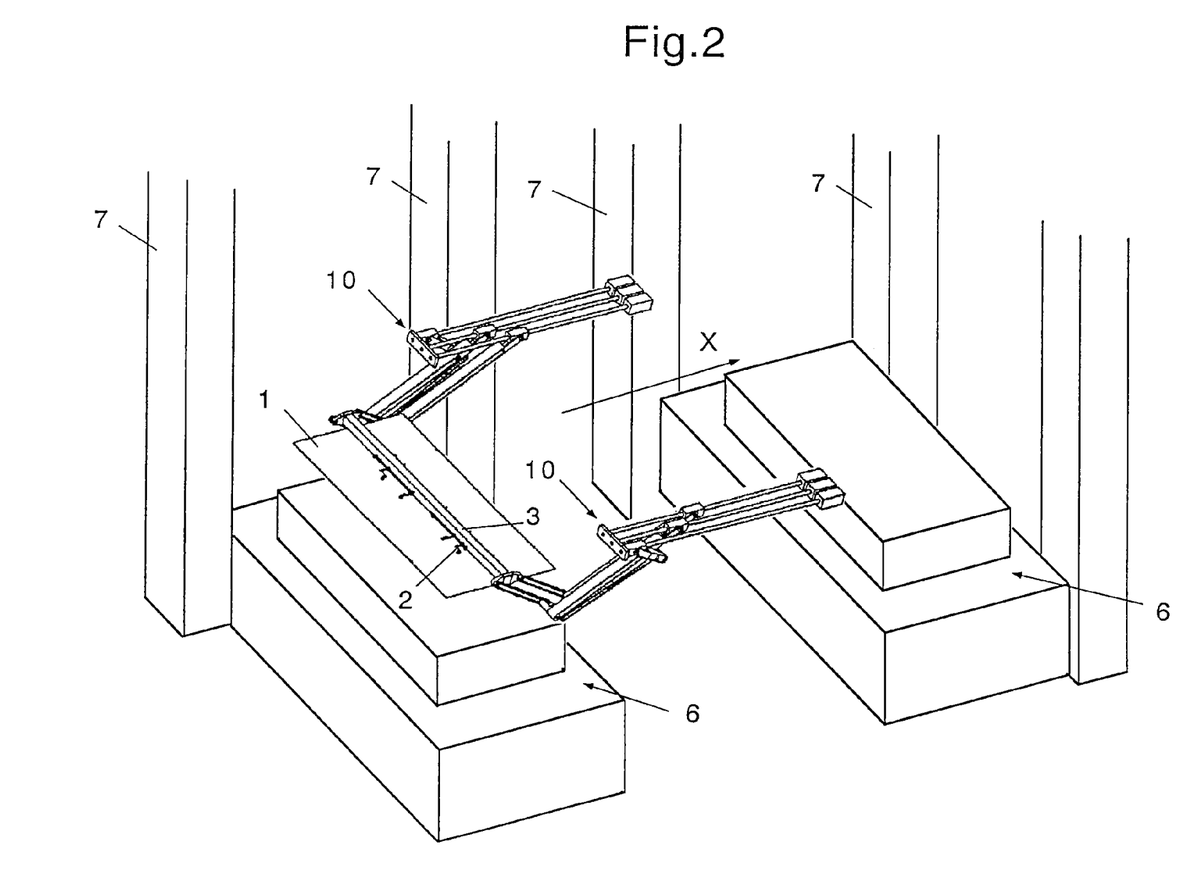
FIG. 2 is a perspective view of a press line including a panel carrying device of the present invention.

FIG. 2 is a perspective view of a press line including a panel carrying device of the present invention. In this figure, for the sake of convenience of description, there are shown two press stations 6 on an upstream side and a downstream side and the panel carrying device of the present invention disposed between the stations, but an actual machine is usually provided with a plurality of, about two to five press stations.

The panel carrying device of the present invention is disposed between the press stations 6 and 6 in order to receive a molded material (panel) 1 from the upstream-side press station 6 and carry the material to the downstream-side press station 6.

The panel carrying device of the present invention includes a pair of feed units 10 symmetrically disposed on opposite sides of each press station that carries the panel 1 to be press-molded in a feed direction X.

The pair of feed units 10 are attached between press stands 7 disposed between the upstream-side press station 6 and the downstream-side press station 6. The respective feed units 10 mutually operate symmetrically with respect to the feed direction X, move a cross bar 3 to which a work holding tool 2 is attached in the feed direction and a vertical direction, and carries the panel 1 to the next press station in order.

This feed unit 10 is installed between the press stations 6 and 6 by attaching opposite end portions of the unit to the upstream and downstream press stations 6 or arms (not shown) disposed on the press stands 7 or hanging the unit from the ceiling.

Figure 3:
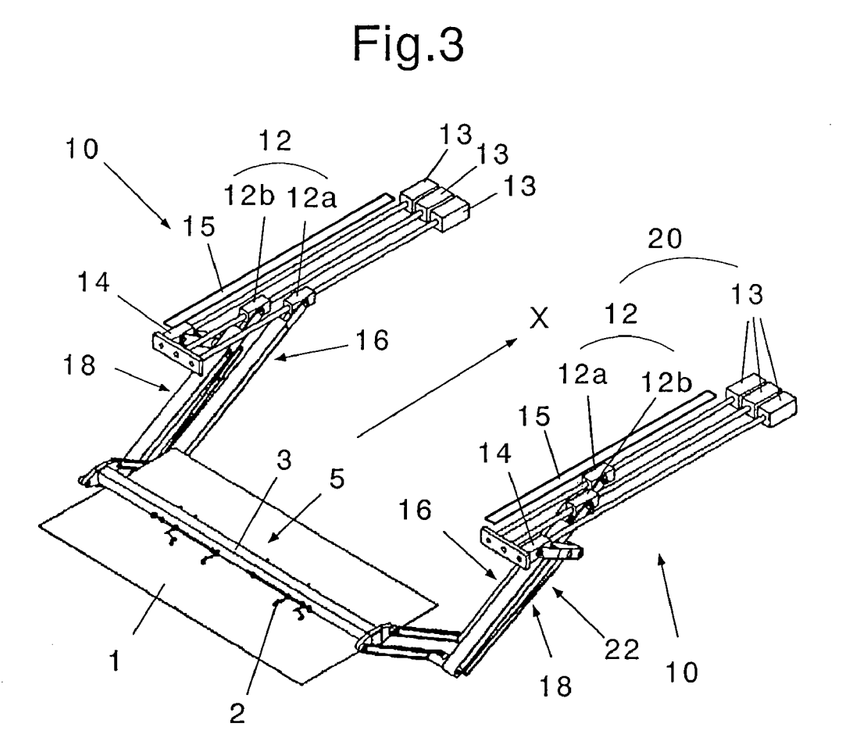
FIG. 3 is a perspective view of a first embodiment of the panel carrying device of the present invention.

FIG. 3 is a perspective view of a first embodiment of the panel carrying device of the present invention. In this figure, each feed unit 10 includes a link mechanism 16, a slide mechanism 20, a swing mechanism 22, and a panel holding device 5.

In this example, each slide mechanism 20 is constituted of a feed slide 12 and translatory actuators 13, each swing mechanism 22 is constituted of the translatory actuators 13, a swing slide 14, and a swinging link mechanism 18, and each panel holding device 5 is constituted of the cross bar 3 and the work holding tool 2.

Each feed slide 12 is constituted of a first feed slide 12*a* and a second feed slide 12*b*. The first feed slide, the second feed slide and the swing slide 14 are linearly driven in the feed direction X by the independent translatory actuators 13, respectively.

In this example, the translatory actuators 13 are ball screws and ball nuts, but the present invention is not limited to this example, and they may be timing belts, hydraulic cylinders, racks and pinions, linear motors or the like.

Moreover, the feed units 10 include translatory guides 15 which guide linear driving of the swing slides 14, the first feed slides 12*a* and the second feed slides 12*b*, respectively.

Furthermore, the translatory actuators 13 and the translatory guides 15 are attached to fixed portions (main bodies or the like) of the press stations 6, respectively, so that only movable portions (the first feed slides 12*a*, the second feed slides 12*b* and the swing slides 14) can linearly be driven in the feed direction X, and correctly positioned by a numerical control or the like.

Figure 4:
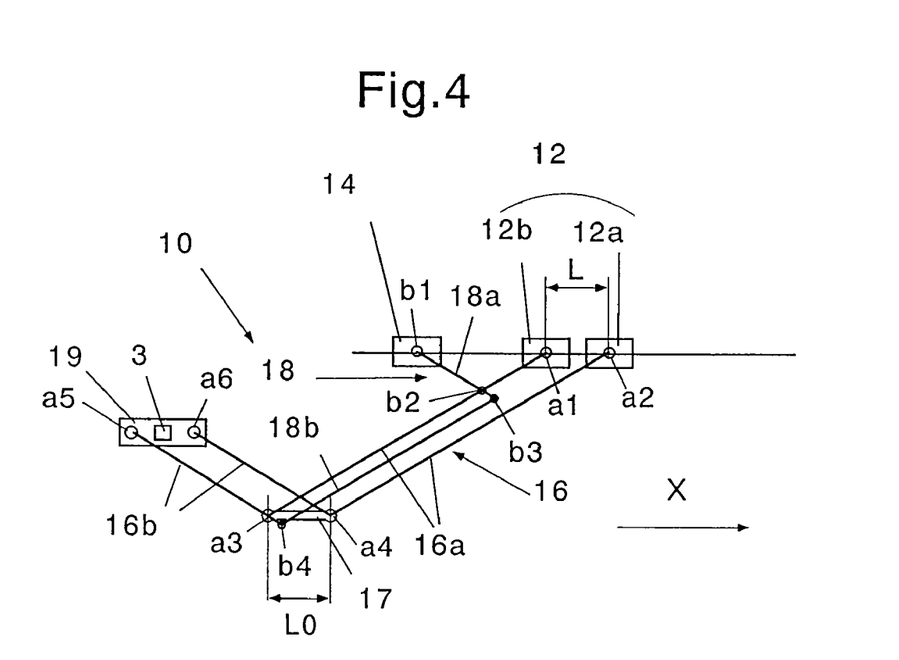
FIG. 4 is a schematic diagram of the panel carrying device of FIG. 3.

FIG. 4 is a schematic diagram of the panel carrying device of FIG. 3. As shown in this figure, each link mechanism 16 is constituted of a first link mechanism and a second link mechanism. Here, the second link mechanism is constituted of: an output member 19 connected to the panel holding device 5; an intermediate member 17 constituting an opposite side of the output member 19; and a pair of second kinks (arms) 16*b* which connect the output member 19 to the intermediate member 17, and the first link mechanism is constituted of a pair of first links (arms) 16*a* which connect the intermediate member 17 to the feed slide 12.

The pair of first links 16*a* have an equal length, have ends a1, a2 (upper ends in the figure) pivotally fitted to the feed slide 12 so as to be rotatable centering on a horizontal axis, and have the other ends a3, a4 (lower ends in the figure) pivotally fitted to the intermediate member 17 so as to be rotatable centering on the horizontal axis. It is to be noted that the pair of first links 16*a* deviate in a width direction (direction perpendicular to a figure sheet surface), and swing centering on the ends a1, a2 and horizontally freely in the figure.

The pair of second links 16*b* have an equal length, and become shorter than the first links 16*a*. The pair of second links 16*b* have ends a3, a4 (lower ends in the figure) pivotally fitted to the intermediate member 17 so as to be rotatable centering on the horizontal axis, and have the other ends a5, a6 (upper ends in the figure) pivotally fitted to the output member 19 so as to be rotatable centering on the horizontal axis. Furthermore, the pair of second links 16*b* deviate in the width direction (direction perpendicular to the figure sheet surface), and swing centering on the ends a3, a4 and horizontally freely in the figure without interfering with the slides 12, 14 and the first links 16*a*.

In FIG. 4, an interval between the pivotally fitted points a3 and a4 of the intermediate member 17 is set to a length L0 equal to an interval between the pivotally fitted points a5 and a6 of the output member 19.

According to this constitution, two parallel links a1, a2, a4 and a3 and a4, a3, a5 and a6 are constituted. Even when the first links 16*a* and the second links 16*b* are swung, the output member 19 can be positioned in parallel with the feed slide 12 (i.e., X-direction), and can be held horizontally without tilting the cross bar 3 attached to this member.

It is to be noted that here, there has been described a case where the link mechanism 16 constitutes the parallel links, but the parallel links do not have to be necessarily constituted depending on a shape of the output member 19 or a way to attach the cross bar 3.

Each swinging link mechanism 18 is constituted of a third link 18*a* and a fourth link 18*b*. The third link 18*a* has one end b1 (upper end in the figure) pivotally fitted to the swing slide 14 so as to be rotatable centering on the horizontal axis, and a part b2 (middle point) of the link is pivotally fitted to the first link 16*a*. The fourth link 18*b* is pivotally fitted to the other end b3 (lower end in the figure) of the third link 18*a* and an extended end b4 (lower end in the figure) of the second link 16*b* so as to be rotatable centering on the horizontal axis.

Moreover, in this example, an interval between the pivotally fitted points b2 and b3 is set to be equal to an interval between the pivotally fitted points a3 and b4. Therefore, a third parallel link b2, b3, b4 and a3 is formed, and the third link 18*a* is constantly parallel to the second links 16*b*.

It is to be noted that the swinging link mechanism 18 is not limited to this example, and may have another constitution as long as the first links 16*a* and the second links 16*b* can be swung. Unlike this example, for example, the fourth link 18*b* may be pivotally fitted to a middle point between the third link 18*a* and the second links 16*b*. Alternatively, the fourth link may be connected to a link on the opposite side.

Figure 9:
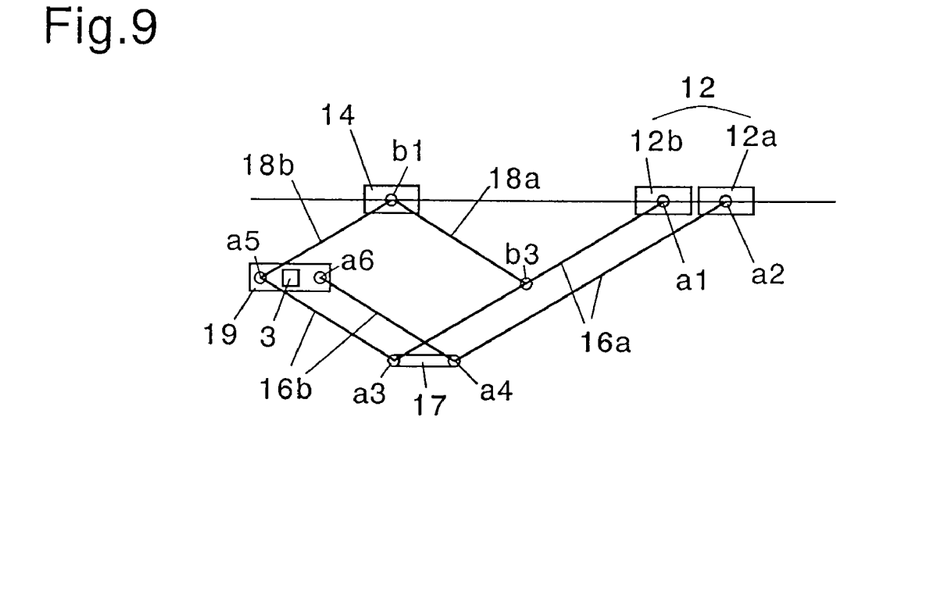
FIG. 9 is a schematic diagram of a second embodiment of the panel carrying device of the present invention.

For example, as shown in FIG. 9, the link 18*a* is rotatably pivotally fitted to the middle point b3 between the upper members a1 and a3 of the first links 16*a*, and the link 18*b* is rotatably pivotally fitted to the pivotally fitted point a5 of the output member. In this case, as compared with the embodiment of FIG. 4, a linear movement distance of the swing slide 14 lengthens, but the third link 18*a* and the lower second link 16*b* are two-point supported by the points b1 and b2, and a3 and a5, respectively. Since the link portions are not bent, the members can be lightened.

According to this constitution, when the swing slide 14 is simply linearly driven in the feed direction X, the first links 16*a* can be swung via the third link 18*a*, and the second links 16b can be swung via the fourth link 18b. Therefore, the swinging link mechanism 18 does not include any driving unit, a movable portion can be lightened, and rigidity of the movable portion can be enhanced to suppress deflection and vibration.

FIGS. 5A to 5E are feed operation explanatory views of the panel carrying device of FIG. 3. In this figure, 6a is a panel holding position of the upstream-side press station 6, and 6b is a panel mounting position on the downstream side. This figure shows a case where the first feed slide 12a, the second feed slide 12b and the swing slide 14 are linearly driven in the feed direction X, while retaining an interval L between the pivotally fitted points of the first feed slide 12a and the second feed slide 12b as an equal length L0 with respect to the interval L0 between the pivotally fitted points of the intermediate member 17 or the output member 19.

Figure 5A:
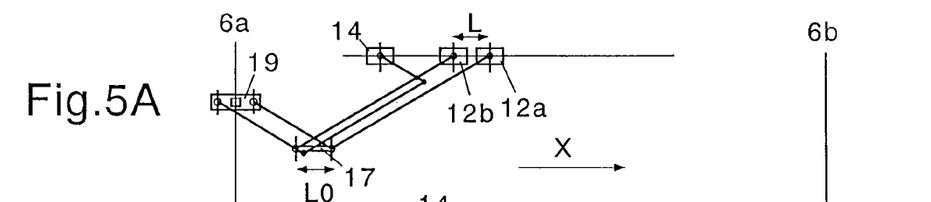
FIGS. 5A to 5E are operation explanatory views of the panel carrying device of FIG. 3.
Figures 5B, 5C:
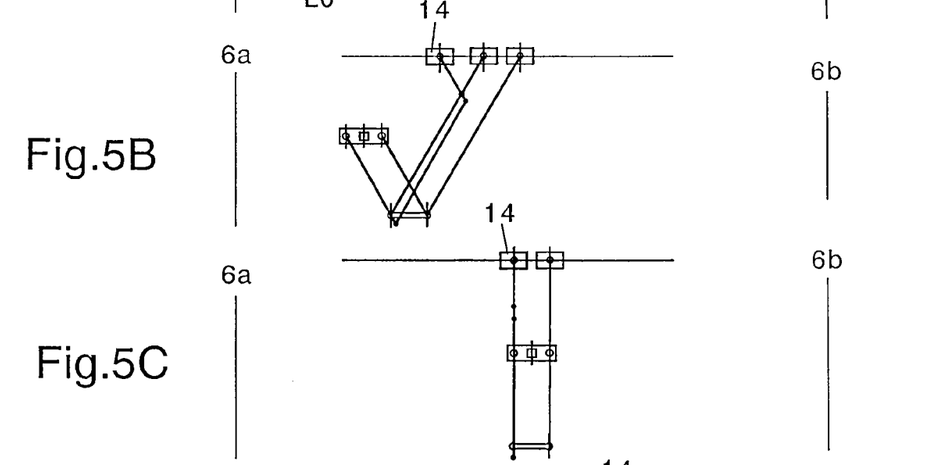

FIG. 5A shows a position of the upstream-side press station 6 lifting the panel. From this position, the first feed slide 12a and the second feed slide 12b are linearly driven toward the upstream side, while retaining the interval L of the pivotally fitted points of the first feed slide and the second feed slide as the equal length L0. Moreover, the swing slide 14 is brought close to the first feed slide 12a as shown in FIG. 5B.

Moreover, the first feed slide 12a and the second feed slide 12b are further linearly driven toward the upstream side. Moreover, the swing slide 14 is linearly driven to a position where the slide is superimposed on the second feed slide 12b (deviates in an axial direction) as shown in FIG. 5C.

Figure 5D:
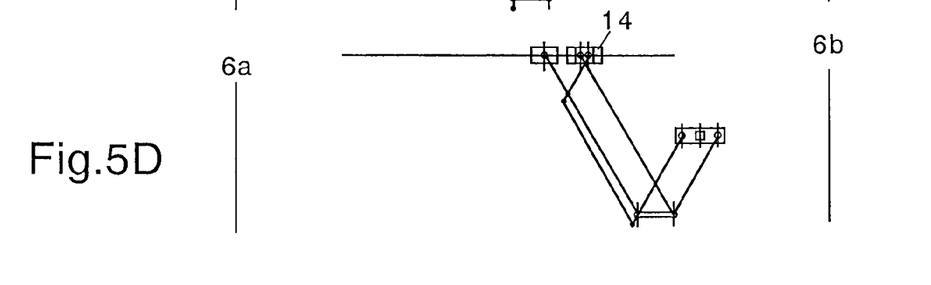
Figure 5E:
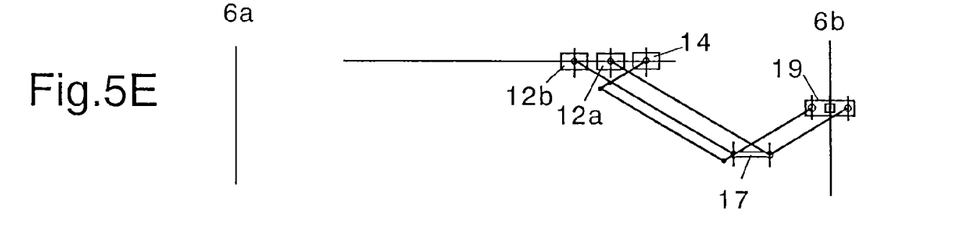

Furthermore, the first feed slide 12a and the second feed slide 12b are further linearly driven toward the upstream side. Moreover, the swing slide 14 is linearly driven rightwards from the first feed slide 12a as shown in FIGS. 5D, 5E. FIG. 5E shows a position of the downstream-side press station 6 lifting the panel.

As shown in FIGS. 5A to 5E, in the constitution of the present invention, the cross bar 3 to which the work holding tool 2 has been attached is attached to a part of the link mechanism 16, and the cross bar 3 is fed and lifted or lowered by linear movements of the feed slide 12 and the swing slide 14 and swing movements of the link mechanism 16 and the swinging link mechanism 18. Therefore, even when a carrying distance is long, a high-speed operation can be performed with a driving unit having a short stroke.

For example, when an interval between the press stations is about 6.5 m, the feed slide 12 and the swing slide 14 linearly move as much as a half of the interval or less, about 3 m. Therefore, even when carrying at a high speed of 10 m/sec or more is demanded, the speed of the driving unit can be halved or less, and the high-speed carrying can easily be realized using the highly practicable translatory actuators 13.

Figure 6A:
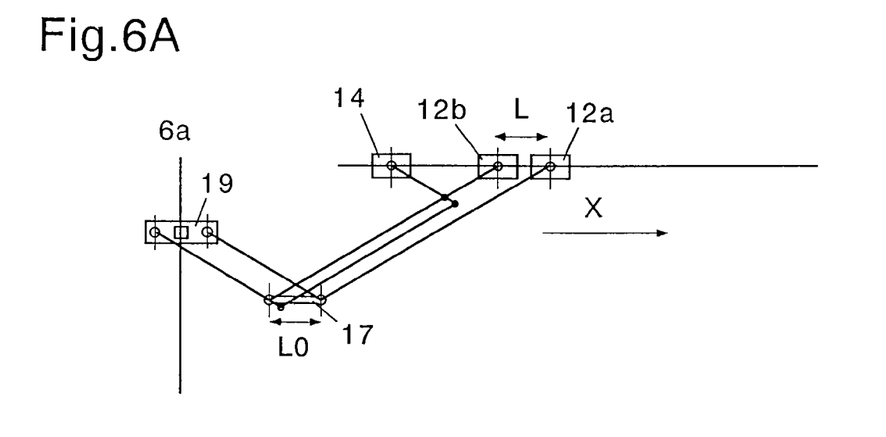
FIGS. 6A and 6B are lifting operation explanatory views of the panel carrying device of FIG. 3.
Figure 6B:
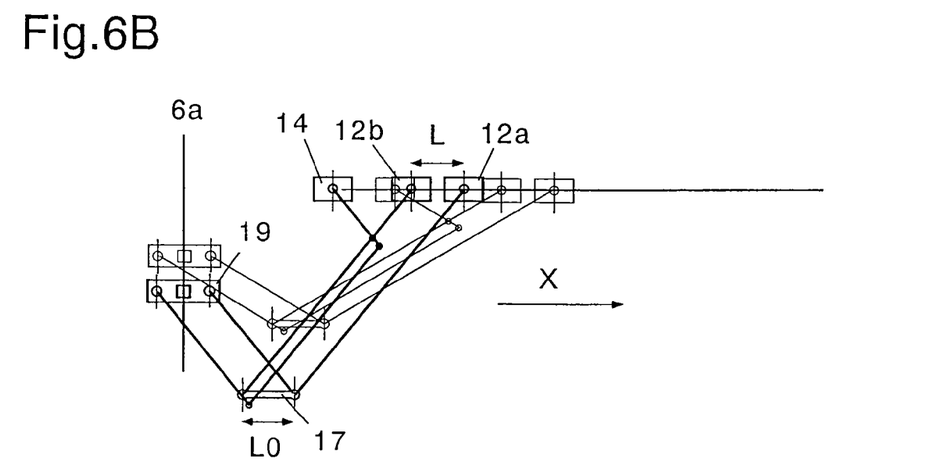

FIGS. 6A and 6B are lifting operation explanatory views of the panel carrying device of FIG. 3. In the figures, FIG. 6A shows a position of the upstream-side press station 6 lifting the panel, and FIG. 6B shows a position of the upstream-side press station 6 before the station lifts the panel, that is, when the station holds the panel. A thin line of FIG. 6B shows the position of FIG. 6A.

As shown in this figure, while retaining the interval L between the pivotally fitted points of the first feed slide 12a and the second feed slide 12b as the equal length L0, the slides are linearly driven on the downstream side. Moreover, when the swing slide 14 is brought close to the first feed slide 12a to reduce a distance between the swing slide 14 and the first feed slide 12a, the output member 19 moves up. When the distance between the swing slide 14 and the first feed slide 12a is increased, the cross bar 3 moves down. Therefore, as shown in FIG. 6B, without changing the positions of the slides in the feed direction X, the output member 19 and the cross bar 3 attached to this member can be lifted without being tilted. It is to be noted that this also applies to the downstream-side press station 6.

Figure 7A:
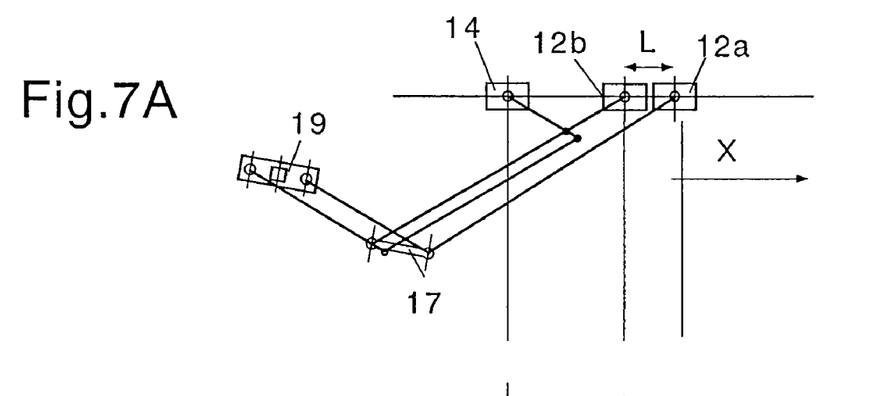
FIGS. 7A, 7B and 7C are tilt operation explanatory views of the panel carrying device of FIG. 3.
Figure 7B:
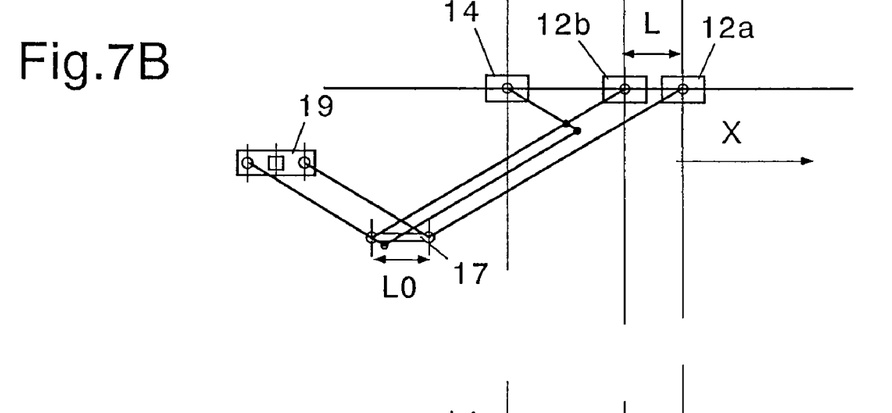
Figure 7C:
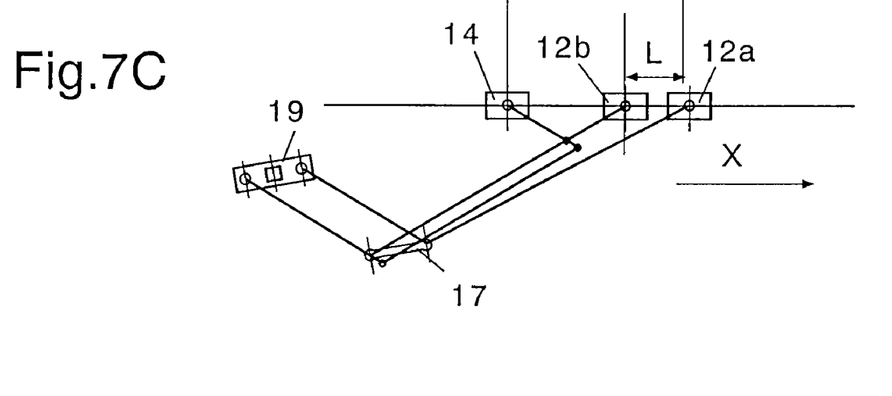

FIGS. 7A, 7B and 7C are tilt operation explanatory views of the panel carrying device of FIG. 3. In the figures, FIG. 7B shows that the interval L between the pivotally fitted points of the first feed slide 12a and the second feed slide 12b is retained as the length L0 equal to that of the intermediate member 17, FIG. 7A shows that the interval L is set to be shorter than L0, and FIG. 7C shows that the interval L is conversely set to be longer than L0. In the figures, the positions of the second feed slide 12b and the swing slide 14 are fixed in the feed direction.

As shown in the figures, when feed amounts of the first feed slide 12a and the second feed slide 12b are varied, the interval L between the pivotally fitted points of the feed slide is set to be shorter than the interval L0 between the pivotally fitted points a of the intermediate member 17. Alternatively, when the interval is set to be longer than this interval L0, the output member 19 is swung with respect to the feed slide, and the work holding tool attached to this member can be swung (tilted).

Figure 8:
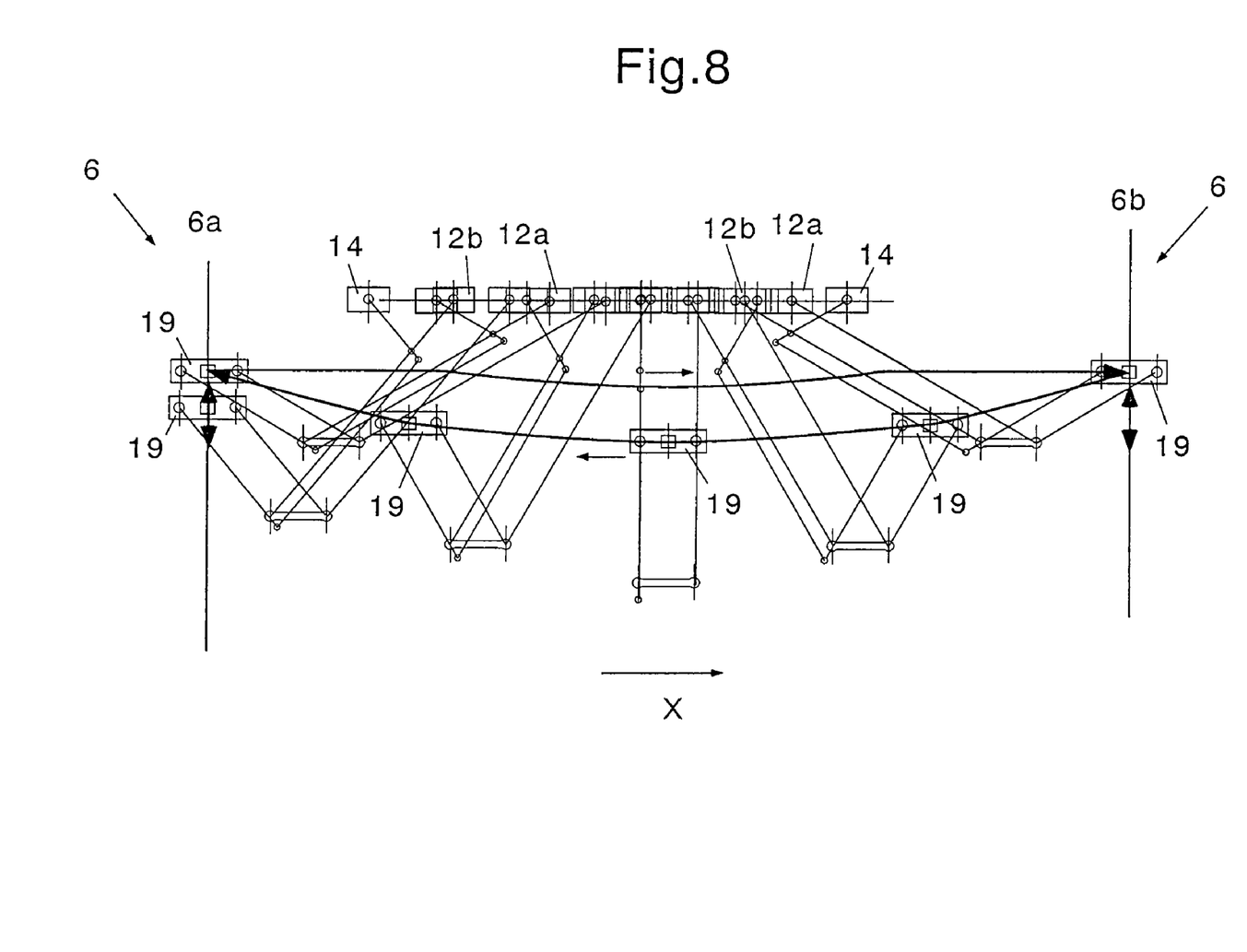
FIG. 8 is a diagram showing one example of a motion curve of the panel carrying device of FIG. 3.

FIG. 8 is a diagram showing one example of a motion curve of the panel carrying device of FIG. 3. As shown in this figures, when the above-described operations of FIGS. 5A to 5E and 6 are combined, the material (panel) 1 molded in the upstream-side press station 6 is held and lifted by the work holding tool attached to the output member 19, carried in the feed direction, and lowered by the downstream-side press station 6 so that the panel can be positioned in a molding position in a mold. Thereafter, the panel is left in the downstream-side press station 6, and the output member 19 is returned to a predetermined stand-by position to perform the molding in the press stations 6.

Figure 10:
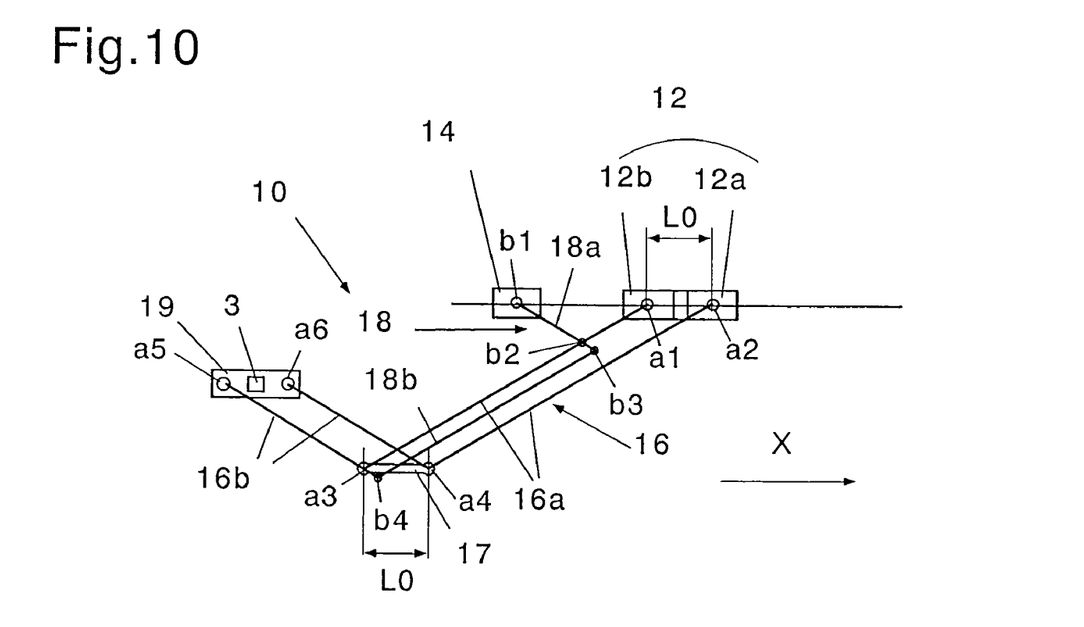
FIG. 10 is a schematic diagram of a third embodiment of the panel carrying device of the present invention.

FIG. 10 is a schematic diagram of a third embodiment of the panel carrying device of the present invention. In this figure, a feed slide 12 is constituted of a first feed slide 12a and a second feed slide 12b which are connected to each other. An interval between pivotally fitted points of the first feed slide 12a and the second feed slide 12b is set to L0 equal to a length of an intermediate member 17. The first feed slide 12a and the second feed slide 12b are linearly driven in a feed direction X by a single translatory actuator. Another constitution is similar to FIGS. 2, 3.

It is to be noted that the first feed slide 12a and the second feed slide 12b may deviate in a width direction (direction perpendicular to the figure sheet surface), but may be arranged along the same line without being shifted in the width direction although not shown.

According to this constitution, the first feed slide 12a and the second feed slide 12b are connected to each other, and linearly driven in the feed direction by the single translatory actuator. Therefore, when the work holding tool does not have to be swung (tilted), a driving mechanism can be simplified.

According to the above constitution of the present invention, a pair of mutually symmetrical feed units 10 are arranged on opposite sides of each press station in the panel feed direction X. The feed units 10 can impart different motions to the press stations.

Moreover, each feed unit 10 is constituted of the feed slide 12 and the swing slide 14 linearly driven in the feed direction X and the link mechanism 16 and the swinging link mechanism 18 pivotally fitted to the slides. Therefore, the movable portions (the link mechanism and the swinging link mechanism) do not have any driving unit, the movable portions can easily be lightened, and the rigidities of the movable portions can be enhanced to suppress the deflection and the vibration.

Furthermore, the cross bar 3 to which the work holding tool 2 is to be attached is attached to a part of the link mechanism 16, and the cross bar 3 is fed and lifted or lowered by the linear movements of the feed slide 12 and the swing slide 14 and the swing movements of the link mechanism 16 and the swinging link mechanism 18. Therefore, even when the carrying distance is long, the high-speed operation can be performed by the driving unit having a short stroke.

As described above, according to the present invention, the following effects can be obtained.

(1) Since a linear feed movement is combined with a rotation movement, a slide stroke of an actuator can be set to be shorter than a feed distance, and driving portions such as ball screws, screws and translatory actuators can easily be designed.

(2) Since a movable portion does not have any power source such as a motor, miniaturizing and lightening of the movable portion can be realized.

(3) When linear movements of the actuators of three systems on one side are combined, a carrying portion on a distant end of a feed unit can realize various movements such as feed of a material in a horizontal direction, vertical positioning (lifting) in a vertical direction and a free posture control (tilt) at a time when the material is placed in a mold.

Therefore, the panel carrying device of the present invention have excellent effects that the device is capable of: imparting different motions to press stations; easily lightening the movable portion; operating at a high speed with a driving unit having a short stroke, even when a carrying distance is long; enhancing rigidity of the movable portion to suppress deflection and vibration; and further swinging (tilting) a work holding tool while the movable portion remains to be light without adding another unit to the movable portion.

It is to be noted that the present invention is not limited to the above-described embodiments, and can needless to say be modified variously within the scope of the present invention.

The invention claimed is:

1. A panel carrying device which carries a panel, comprising:
   (a) a panel holding device that holds the panel;
   (b) a second link mechanism connected to the panel holding device;
   (c) a first link mechanism pivotally fitted to the second link mechanism;
   (d) a slide mechanism that moves the first link mechanism in a panel carrying direction, wherein the slide mechanism comprises
      i. a feed slide into which the first link mechanism is pivotally fitted; and
      ii. a first translatory actuator that drives the feed slide in the carrying direction of the panel; and
   (e) a swing mechanism that swings the second link mechanism, wherein the swing mechanism comprises
      i. a swinging link mechanism pivotally fitted to the first link mechanism and the second link mechanism;
      ii. a swing slide pivotally fitted to the swinging link mechanism; and
      iii. a second translatory actuator that drives the swing slide pivotally fitted to the swinging link mechanism in the carrying direction of the panel, wherein the first link mechanism is operable to swing back and forth in the carrying direction of the panel due to the slide mechanism and the second link mechanism is operable to swing back and forth in the carrying direction of the panel due to the first link mechanism,
   wherein the first link mechanism and the second link mechanism swing back and forth in the carrying direction of the panel by changing a relative distance between the feed slide and the swing side in the carrying direction of the panel, and
   wherein the first link mechanism and the second link mechanism move back and forth in the carrying direction of the panel by moving the feed slide and the swing slide in the carrying direction of the panel.

2. The panel carrying device according to claim 1, wherein on opposite sides of the panel holding device, a pair of first link mechanisms, second link mechanisms, slide mechanisms and swing mechanisms are arranged symmetrically with respect to each other.

3. The panel carrying device according to claim 2, wherein the first translatory actuator of the slide mechanism and the second translatory actuator of the swing mechanism are arranged in parallel.

4. The panel carrying device according to claim 1, wherein the second link mechanism includes an output member connected to the panel holding device, an intermediate member constituting an opposite side of the output member and two arms connecting the output member to the intermediate member, wherein the two arms constitute a parallel link.

5. The panel carrying device according to claim 4, wherein the first link mechanism includes two arms connecting the intermediate member to the slide mechanism.

6. The panel carrying device according to claim 1, wherein the slide mechanism moves the feed slide in the carrying direction of the panel while two arms of the first link mechanism are kept in parallel with each other.

7. The panel carrying device according to claim 1, wherein the slide mechanism individually drives two arms of the first link mechanism to move the feed slide in the carrying direction of the panel, and tilts the panel holding device.

8. The panel carrying device according to claim 1, wherein the first translatory actuator of the slide mechanism and the second translatory actuator of the swing mechanism are arranged in parallel.

9. The panel carrying device according to claim 8, wherein the first translatory actuator of the slide mechanism and the second translatory actuator of the swing mechanism are selected from the group consisting of a ball screw and a ball nut, timing belts, hydraulic cylinders, a rack and a pinion, and linear motors.

10. The panel carrying device according to claim 1, wherein the first translatory actuator of the slide mechanism and the second translatory actuator of the swing mechanism are selected from the group consisting of a ball screw and a ball nut, timing belts, hydraulic cylinders, a rack and a pinion, and linear motors.

11. The panel carrying device according to claim 1, wherein the panel holding device includes a cross bar connected to the second link mechanism, and a work holding tool attached to the cross bar.

* * * * *